US012406682B2

(12) United States Patent
Jia et al.

(10) Patent No.: US 12,406,682 B2
(45) Date of Patent: Sep. 2, 2025

(54) REAL-TIME LOW-COMPLEXITY ECHO CANCELLATION

(71) Applicant: Zoom Video Communications, Inc., San Jose, CA (US)

(72) Inventors: Zhaofeng Jia, Saratoga, CA (US); Yang Liu, Wetherby (GB); Qiyong Liu, Singapore (SG)

(73) Assignee: Zoom Communications, Inc., San Jose, CA (US)

( * ) Notice: Subject to any disclaimer, the term of this patent is extended or adjusted under 35 U.S.C. 154(b) by 815 days.

(21) Appl. No.: 17/512,506

(22) Filed: Oct. 27, 2021

(65) Prior Publication Data

US 2023/0096565 A1 Mar. 30, 2023

(30) Foreign Application Priority Data

Sep. 24, 2021 (CN) .......................... 202111122229.9

(51) Int. Cl.
*H04B 3/20* (2006.01)
*G10L 21/0208* (2013.01)

(52) U.S. Cl.
CPC .................... *G10L 21/0208* (2013.01); *G10L 2021/02082* (2013.01)

(58) Field of Classification Search
CPC ...... G10L 21/0208; G10L 2021/02082; G06V 10/82; H04M 9/082
USPC ........................................................... 381/66
See application file for complete search history.

(56) References Cited

U.S. PATENT DOCUMENTS

| | | | | |
|---|---|---|---|---|
| 2013/0216057 A1* | 8/2013 | Thyssen | H04M 9/082 381/66 |
| 2019/0222691 A1* | 7/2019 | Shah | G10L 21/0208 |
| 2022/0277721 A1* | 9/2022 | Zhang | G10L 21/0208 |
| 2023/0094630 A1* | 3/2023 | Zhang | G06V 10/82 704/226 |

OTHER PUBLICATIONS

Luo, Yi, and Nima Mesgarani. "Conv-tasnet: Surpassing ideal time-frequency magnitude masking for speech separation." IEEE/ACM transactions on audio, speech, and language processing 27, No. 8 (2019): 1256-1266.

(Continued)

*Primary Examiner* — Md S Elahee
(74) *Attorney, Agent, or Firm* — Kilpatrick Townsend & Stockton LLP

(57) ABSTRACT

Methods, systems, and apparatus, including computer programs encoded on computer storage media relate to a method for acoustic echo cancellation. The system inputs one or more signal representations into an acoustic echo cancellation network comprising one or more network blocks to generate a mask, each network block comprising one or more convolutional blocks, each convolutional block comprising one or more neural networks. The system combines the mask and a near-end audio signal representation to generate an echo-cancelled audio signal representation. The system generates an echo-cancelled audio signal based on the echo-cancelled audio signal representation.

20 Claims, 13 Drawing Sheets

200

(56) References Cited

OTHER PUBLICATIONS

Valin, Jean-Marc, Srikanth Tenneti, Karim Helwani, Umut Isik, and Arvindh Krishnaswamy. "Low-Complexity, Real- Time Joint Neural Echo Control and Speech Enhancement Based On Percepnet." In ICASSP 2021-2021 IEEE International Conference on Acoustics, Speech and Signal Processing (ICASSP), pp. 7133-7137. IEEE, 2021.
Chen, Hongsheng, Teng Xiang, Kai Chen, and Jing Lu. "Nonlinear Residual Echo Suppression Based on Multi-stream Conv-TasNet." arXiv preprint arXiv:2005.07631 (2020).
Halimeh, Mhd Modar, and Walter Kellermann. "Efficient multichannel nonlinear acoustic echo cancellation based on a cooperative strategy." In ICASSP 2020-2020 IEEE International Conference on Acoustics, Speech and Signal Processing (ICASSP), pp. 461-465. IEEE, 2020.
Pfeifenberger, Lukas, and Franz Pernkopf. "Nonlinear Residual Echo Suppression Using a Recurrent Neural Network." In Interspeech, pp. 3950-3954. 2020.
Fan, Wenzhi, and Jing Lu. "Improving partition-block-based acoustic echo canceler in under-modeling scenarios." arXiv preprint arXiv:2008.03944 (2020).
Valin, Jean-Marc. "A hybrid DSP/deep learning approach to real-time full-band speech enhancement." In 2018 IEEE 20th international workshop on multimedia signal processing (MMSP), pp. 1-5. IEEE, 2018.
Halimeh, Mhd Modar, Thomas Haubner, Annika Briegleb, Alexander Schmidt, and Walter Kellermann. "Combining Adaptive Filtering And Complex-Valued Deep Postfiltering For Acoustic Echo Cancellation." In ICASSP 2021-2021 EEE International Conference on Acoustics, Speech and Signal Processing (ICASSP), pp. 121-125. IEEE, 2021.
Zhang, Yi, Chengyun Deng, Shiqian Ma, Yongtao Sha, and Hui Song. "Deep Multi-task Network for Delay Estimation and Echo Cancellation." arXiv preprint arXiv:2011.02109 (2020).
Bagheri, Saeed, and Daniele Giacobello. "Robust STFT Domain Multi-Channel Acoustic Echo Cancellation with Adaptive Decorrelation of the Reference Signals." In ICASSP 2021-2021 IEEE International Conference on Acoustics, Speech and Signal Processing (ICASSP), pp. 131-135. IEEE, 2021.
Kim, Eesung, Jae-Jin Jeon and Hyeji Seo. "U-Convolution Based Residual Echo Suppression with Multiple Encoders." ICASSP 2021-2021 IEEE International Conference on Acoustics, Speech and Signal Processing (ICASSP) (2021): 925-929.

* cited by examiner

REAL-TIME LOW-COMPLEXITY ECHO CANCELLATION

FIELD

This application relates generally to audio processing, and more particularly, to systems and methods for acoustic echo cancellation.

SUMMARY

The appended claims may serve as a summary of this application.

DETAILED DESCRIPTION OF THE DRAWINGS

Figure 1A:
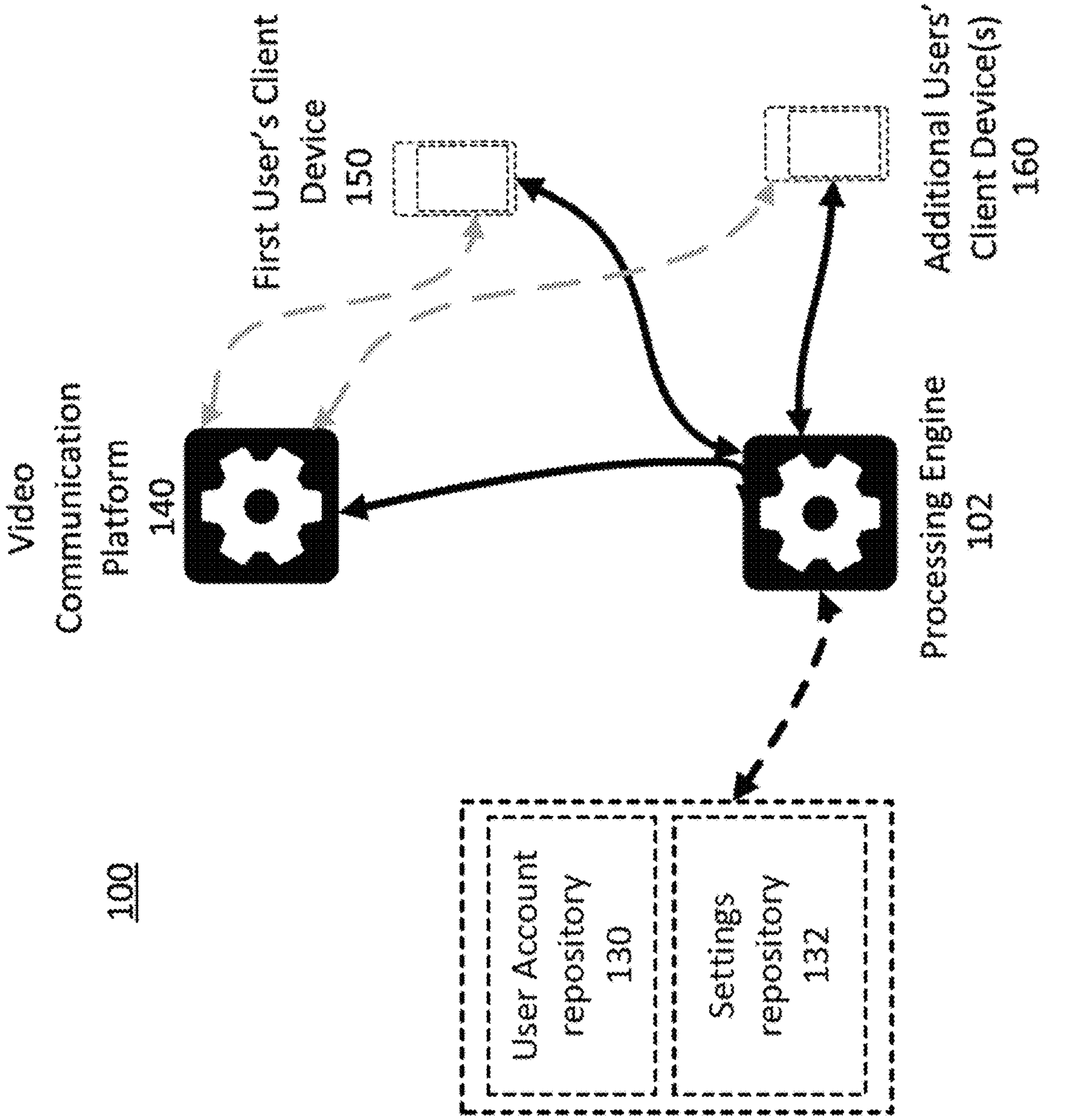
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

I. Exemplary Environments

FIG. 1A is a diagram illustrating an exemplary environment in which some embodiments may operate. In the exemplary environment 100, a first user's client device 150 and one or more additional users' client device(s) 160 are connected to a processing engine 102 and, optionally, a video communication platform 140. The processing engine 102 is connected to the video communication platform 140, and optionally connected to one or more repositories and/or databases, including a user account repository 130 and/or a settings repository 132. One or more of the databases may be combined or split into multiple databases. The first user's client device 150 and additional users' client device(s) 160 in this environment may be computers, and the video communication platform server 140 and processing engine 102 may be applications or software hosted on a computer or multiple computers which are communicatively coupled via remote server or locally.

The exemplary environment 100 is illustrated with only one additional user's client device, one processing engine, and one video communication platform, though in practice there may be more or fewer additional users' client devices, processing engines, and/or video communication platforms. In some embodiments, one or more of the first user's client device, additional users' client devices, processing engine, and/or video communication platform may be part of the same computer or device.

In an embodiment, the first user's client device 150 and additional users' client devices 160 may perform the method 500 (FIG. 5), method 600 (FIGS. 6A-B), or other methods herein and, as a result, provide for acoustic echo cancellation within a video communication platform. In some embodiments, this may be accomplished via communication with the first user's client device 150, additional users' client device(s) 160, processing engine 102, video communication platform 140, and/or other device(s) over a network between the device(s) and an application server or some other network server. In some embodiments, the processing engine 102 is an application, browser extension, or other piece of software hosted on a computer or similar device or is itself a computer or similar device configured to host an application, browser extension, or other piece of software to perform some of the methods and embodiments herein.

The first user's client device 150 and additional users' client device(s) 160 are devices with a display configured to present information to a user of the device. In some embodiments, the first user's client device 150 and additional users' client device(s) 160 present information in the form of a user interface (UI) with UI elements or components. In some embodiments, the first user's client device 150 and additional users' client device(s) 160 send and receive signals and/or information to the processing engine 102 and/or video communication platform 140. The first user's client device 150 is configured to perform functions related to presenting and playing back video, audio, documents, annotations, and other materials within a video presentation (e.g., a virtual class, lecture, webinar, or any other suitable video presentation) on a video communication platform. The additional users' client device(s) 160 are configured to viewing the video presentation, and in some cases, presenting material and/or video as well. In some embodiments, first user's client device 150 and/or additional users' client device(s) 160 include an embedded or connected camera which is capable of generating and transmitting video content in real time or substantially real time. For example, one or more of the client devices may be smartphones with built-in cameras, and the smartphone operating software or applications may provide the ability to broadcast live streams based on the video generated by the built-in cameras. In some embodiments, the first user's client device 150 and additional users' client device(s) 160 are computing devices capable of hosting and executing one or more applications or other programs capable of sending and/or receiving information. In some embodiments, the first user's client device 150 and/or additional users' client device(s) 160 may be a computer desktop or laptop, mobile phone, virtual assistant, virtual reality or augmented reality device, wearable, or any other suitable device capable of sending and receiving information. In some embodiments, the processing engine 102 and/or video communication platform 140 may be hosted in whole or in part as an application or web service executed on the first user's client device 150 and/or additional users' client device(s) 160. In some embodiments, one or more of the video communication platform 140, processing engine 102, and first user's client device 150 or additional users' client devices 160 may be the same device. In some embodiments, the first user's client device 150 is associated with a first user account on the video communication platform, and the additional users' client device(s) 160 are associated with additional user account(s) on the video communication platform.

In some embodiments, optional repositories can include one or more of a user account repository 130 and settings repository 132. The user account repository may store and/or maintain user account information associated with the video communication platform 140. In some embodiments, user account information may include sign-in information, user settings, subscription information, billing information, connections to other users, and other user account information. The settings repository 132 may store and/or maintain settings associated with the communication platform 140. In some embodiments, settings repository 132 may include AEC settings, audio settings, video settings, video processing settings, and so on. Settings may include enabling and disabling one or more features, selecting quality settings, selecting one or more options, and so on. Settings may be global or applied to a particular user account.

Video communication platform 140 is a platform configured to facilitate video presentations and/or communication between two or more parties, such as within a video conference or virtual classroom.

Exemplary environment 100 is illustrated with respect to a video communication platform 140 but may also include other applications such as audio calls. Systems and methods herein for acoustic echo cancellation may be trained and used as a software module for AEC in software applications for audio calls and other applications in addition to or instead of video communications.

Figure 1B:
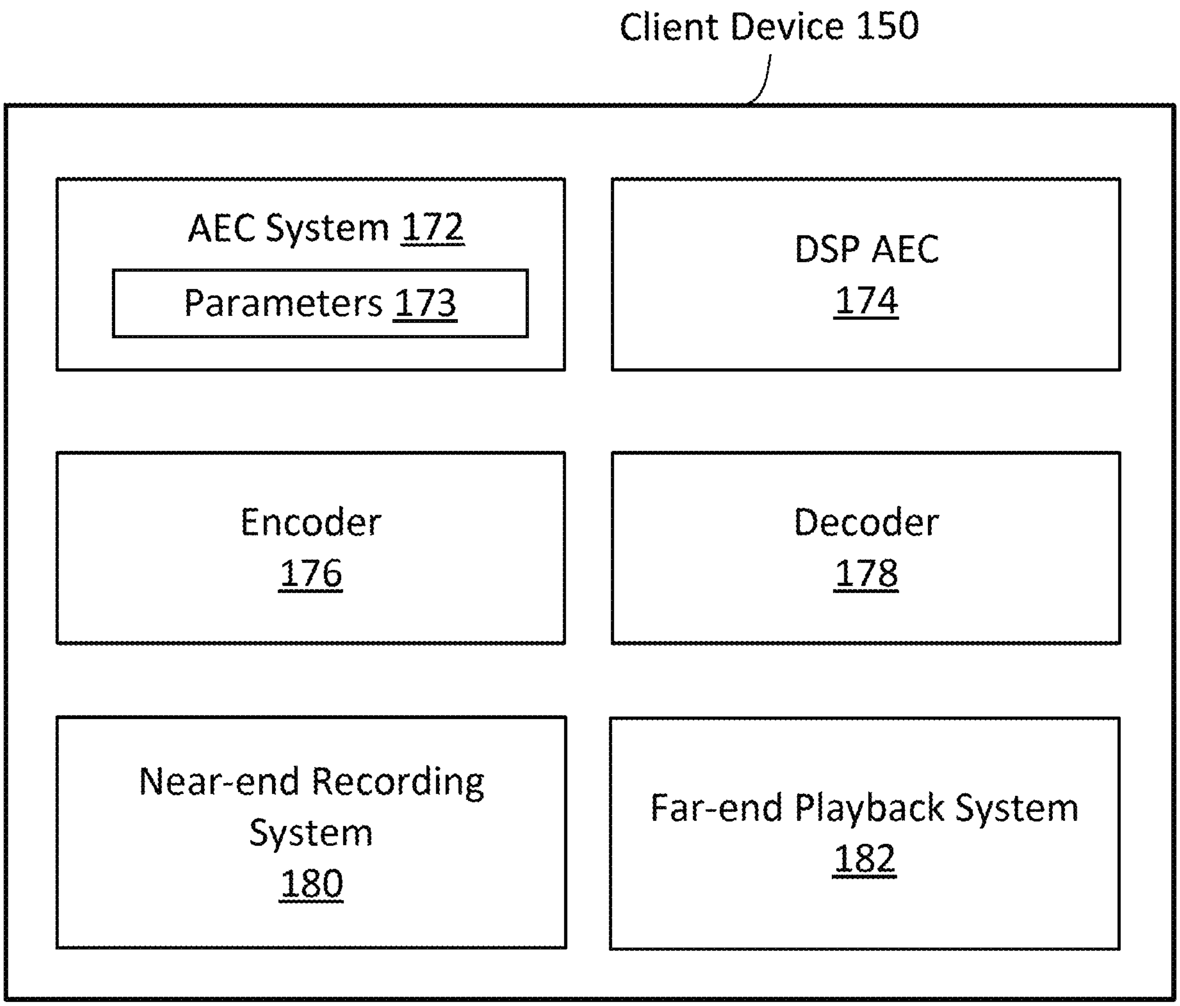
FIG. 1B is a diagram illustrating a client device with software and/or hardware modules that may execute some of the functionality described herein.

FIG. 1B is a diagram illustrating a client device 150 with software and/or hardware modules that may execute some of the functionality described herein.

The AEC system 172 provides system functionality for acoustic echo cancellation, which may include reducing or removing echo to improve sound quality for a user. In some embodiments, echo may arise in a video communication platform 140 or other applications when far-end audio is played in a room and generates echo from walls, objects, or other echo paths, which is then picked up by recording equipment in the room that is recording a near-end audio signal. The near-end audio signal may comprise both the echo of the far-end audio and near-end speech, such as a user speaking in the room for a video conference. Acoustic echo cancellation of near-end audio signal may include reducing or removing the echo to include only, to the extent possible, the near-end speech. In some embodiments, AEC system 172 may comprise a ML system comprising software stored in memory and/or computer storage and executed on one or more processors. In some embodiments, AEC system 172 may comprise one or more neural networks, such as deep neural networks (DNNs), for acoustic echo cancellation. AEC system 172 may include one or more parameters 173, such as internal weights of a neural network, that may determine the operation of AEC system 172. In an embodiment, the AEC system 172 receives as input a far-end audio signal representation, a near-end audio signal representation, and a linear output signal representation. In alternative embodiments, more or fewer signal representations may be received as input. In an embodiment, AEC system 172 comprises one or more network blocks, each network block comprising one or more convolutional blocks, each convolutional block comprising one or more neural networks. AEC system 172 may generate a mask that may be combined with the near-end audio signal representation to generate an echo-cancelled audio signal representation, which represents an echo-cancelled audio signal where echo has been decreased. Parameters 173 may be learned by training the AEC system 122 using the AEC training platform 190, which may comprise a software module.

The DSP acoustic echo canceller (AEC) 174 provides system functionality for generating a linear output signal 264. In some embodiments, DSP AEC 174 may comprise a hardware DSP in client device 150. DSP AEC 174 may receive as input a far-end audio signal 260 from video communication platform 140 to be played back by far-end playback system 182. DSP AEC 174 may sample and store the far-end audio signal 260 as a reference signal in a reference block. DSP AEC 174 may generate a cancellation signal based on the reference signal, such as by inverting the reference signal. DSP AEC 174 may receive as input a near-end audio signal 262 from a near-end recording system 180 and, using a linear filter, combine the cancellation signal with the near-end audio signal 262 to generate linear output signal 264. The linear output signal 264 may represent near-end audio signal 262 with partial echo cancellation via the combination of the signals by the linear filter. DSP AEC 174 may include delay estimation to introduce a delay between the cancellation signal and the near-end audio signal 262 to allow for delay in far-end audio signal 260 following echo paths in the room to generate echo in the near-end audio signal 262. Traditional DSP AEC may include a non-linear filter to combine a cancellation signal with the near-end audio signal 262 to cancel echo in the near-end audio signal 262, but the non-linear filter is not required in systems and methods herein.

The encoder 176 provides system functionality for generating an audio signal representation based on an audio signal. Encoder 176 may comprise software and/or hardware. In an embodiment, encoder 176 receives as input and encodes far-end audio signal 260, near-end audio signal 262, and linear output signal 264. Alternatively, encoder 176 may receive and encode as input just the far-end audio signal 260 and near-end audio signal 262, or, in a further alternative, may receive and encode far-end audio signal 260, near-end audio signal 262, linear output signal 264, and non-linear output signal from DSP AEC 174.

In one embodiment, encoder 176 performs STFT on an audio signal to generate a spectrogram. Alternatively, encoder 176 may generate audio signal representation using other features of the audio signal such as magnitude of STFT, magnitude and phase of STFT, real and imaginary components of STFT, energy, log energy, mel spectrum, mel-frequency cepstral coefficients (MFCC), combinations of these features, and other features. Encoder 176 may comprise for example, a free filter bank, free analytic filter bank, mel magnitude spectrogram filter bank, multi-phase gammatone filter bank, or other encoders. In some embodiments, the filter bank may be fully learned with analyticity constraints, such as through learning parameters of the filters through machine learning, such as neural networks. In some embodiments, encoder 176 may comprise a machine-learning based encoder, such as a neural network, CNN, or DNN, that is trained to generate an encoding of an audio signal.

The decoder 178 provides system functionality for generating an audio signal based on an audio signal representation such as far-end audio signal representation, near-end audio signal representation, linear output signal representation, or echo-cancelled audio signal representation. Decoder 178 may comprise software and/or hardware. Decoder 178 may perform the inverse function to the encoding function of encoder 176 to convert an audio signal representation to an audio signal. In one embodiment, decoder 178 performs inverse-STFT on an audio signal representation to convert an STFT spectrogram to an audio signal. Alternatively, in some embodiments, decoder 178 may comprise a filter bank that performs the inverse function to encoder 176, such as a free filter bank, free synthesis filter bank, inverse mel magnitude spectrogram filter bank, inverse multi-phase gammatone filter bank, or other decoders. In some embodiments, decoder 178 may comprise a machine-learning based decoder, such as a neural network, CNN, or DNN, that is trained to generate an audio signal from an audio signal representation.

Near-end recording system 180 may comprise software and/or hardware for recording a near-end audio signal. In an embodiment, near-end recording system 180 may comprise a microphone and audio recording drivers. In some embodiments, near-end recording system 180 may comprise a built-in microphone, such as on a smartphone.

Far-end playback system 182 may comprise software and/or hardware for playing back a far-end audio signal. In an embodiment, far-end playback system 182 may comprise one or more speakers and audio drivers. In some embodiments, far-end playback system 182 may comprise a built-in speaker, such as on a smartphone.

Although the AEC system 172, DSP AEC 174, encoder 176, decoder 178, near-end recording system 180, and far-end playback system 182 are illustrated as residing on client device 150, it should be understood that some or all of these components may alternatively reside in video communication platform 140, processing engine 102, or other computer systems external to client device 150. For example, video communication platform 140 and/or processing engine 102 may receive an audio signal from client device 150 and perform acoustic echo cancellation on the audio signal using AEC system 172, DSP AEC 174, encoder 176, and decoder 178 and transmit the echo-cancelled audio signal to other client devices 160.

The above modules and their functions will be described in further detail in relation to exemplary methods and systems below.

Figure 1C:
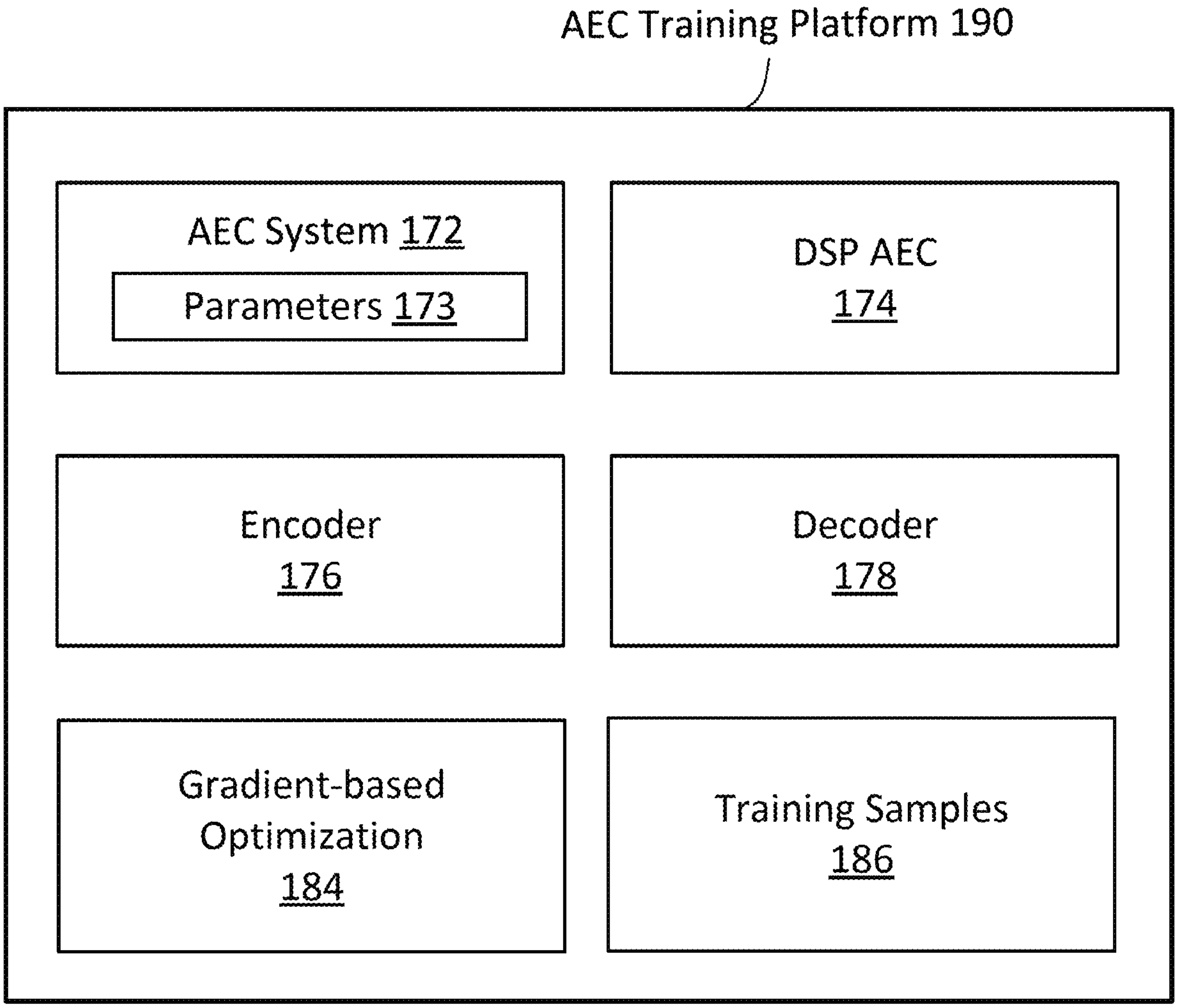
FIG. 1C is a diagram illustrating AEC training platform with software and/or hardware modules that may execute some of the functionality described herein.

FIG. 1C is a diagram illustrating AEC training platform 190 with software and/or hardware modules that may execute some of the functionality described herein.

AEC training platform 190 may comprise a computer system for training AEC system 172 using training data to determine parameters 173. After AEC system 172 is trained on AEC training platform 190, the AEC system 172 may be deployed and installed on client devices 150, 160 or video communication platform 140 and/or processing engine 102.

AEC training platform 190 may comprise AEC system 172, parameters 173, DSP AEC 174, encoder 176, and decoder 178 as previously described in FIG. 1B. AEC training platform 190 may optionally include near-end recording system 180 and far-end playback system 182. AEC platform 190 may also comprise gradient-based optimization module 184 and training samples 186.

The gradient-based optimization module 184 provides system functionality for performing a gradient-based optimization algorithm to update the parameters 173 of AEC system 172. In an embodiment, parameters 173 are learned by updating the parameters 173 in the AEC system 172 to minimize a loss function according to a gradient-based optimization algorithm. In some embodiments, the AEC system 172 comprises a neural network and parameters 173 comprise internal weights that are updated by backpropagation in the neural network based on the loss function. Updating the parameters 173 may end when the gradient-based optimization algorithm converges. AEC system 172 may be trained using one or more training samples 186.

The training samples 186 may comprise a repository, dataset, or database of training data for learning the parameters 173. In some embodiments, training samples 186 comprise input and output pairs for supervised learning, wherein the input may comprise one or more audio signals or audio signal representations for input and the output may comprise an audio signal or audio signal representation of the target output of the AEC system 172. The error between the actual output of AEC system 172 based on the inputs and the target output may be determined according to a loss function, which may be used for gradient-based optimization.

Figure 2:
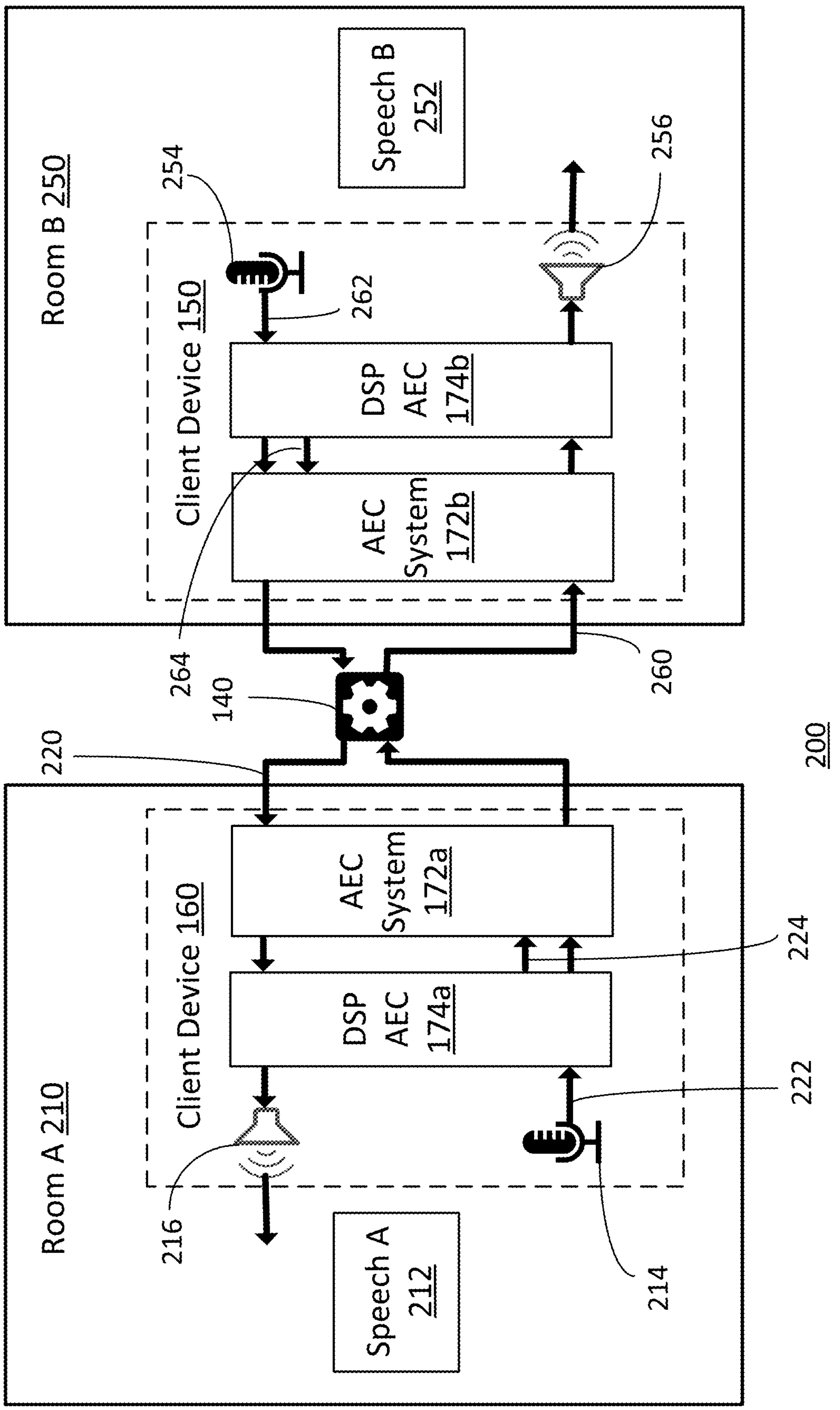
FIG. 2 is a diagram illustrating an exemplary environment in which some embodiments may operate.

FIG. 2 is a diagram illustrating an exemplary environment 200 in which some embodiments may operate.

Speech A 212 is emitted in room A 210 and is recorded by microphone 214, which may comprise part of a near-end recording system, of client device 160 in room A 210. For example, speech A 212 may comprise speech of a user in room A 210, such as during inference during a video conference, or an audio recording, such as during training to train AEC system 172 with ground truth examples. Microphone A 214 generates a near-end audio signal 222 based on the near-end audio recorded from room A 210.

DSP AEC 174*a* comprises a component of client device 160. DSP AEC 174*a* receives the near-end audio signal 222 as input and generates a linear output signal 224 based on the near-end audio signal 222. Optionally, DSP AEC 174*a* may include a non-linear filter that may also be applied to near-end audio signal 222 to generate a non-linear output signal. DSP AEC 174*a* transmits the near-end audio signal 222 and the linear output signal 224 to AEC system 172*a* of client device 160. In some embodiments, the near-end audio signal 222 may be passed without modification from the DSP AEC 174*a* to the AEC system 172*a* or may be received by the AEC system 172*a* directly from the microphone 214.

AEC system 172*a* performs acoustic echo cancellation on the near-end audio signal 222 based on a far-end audio signal 220, near-end audio signal 222, and linear output signal 224 to generate an echo-cancelled audio signal. The client device 160 may transmit the echo-cancelled audio signal over a network to the video communication platform 140, which transmits the echo-cancelled audio signal to client device 150 in room B 250 as far-end audio signal 260.

Far-end audio signal 260 is received by client device 150 over a network. Far-end audio signal 260 is received and stored by AEC system 172*b* of client device 150 to use for acoustic echo cancellation of speech from room B 250. AEC system 172*b* transmits the far-end audio signal 260 to DSP AEC 174*b* of client device 150 for DSP AEC 174*b* to sample and store as a reference signal in a reference block. In some embodiments, the far-end audio signal 260 may be passed without modification from the AEC system 172*b* to the DSP AEC 174*b* or may be received by the DSP AEC 174*b* from the network in parallel with AEC 172*b*.

DSP AEC 174*b* transmits the far-end audio signal 260 to speaker 256, which may comprise part of a far-end playback system. In some embodiments, the far-end audio signal 260 may be passed without modification from the DSP AEC 174*b* to the speaker 256 or may be received by the speaker 256 from the network in parallel with DSP AEC 174*b*. The speaker 256 emits the far-end audio signal 260 as audio in room B 250. The far-end audio signal 260 may reflect from walls, objects, or other echo paths in room B 250 and generate echo in room B 250.

Speech B 252 is emitted in room B 250 and combines with the echo in room B 250 from far-end audio signal 260. The combination of speech B 252 and echo of far-end audio signal 260 is recorded by microphone 254, which may comprise part of a near-end recording system, of client device 150 in room B 250. For example, speech B 252 may comprise speech of a user in room B 250, such as during inference during a video conference, or an audio recording, such as during training to train AEC system 172 with ground truth examples. Microphone B 254 generates a near-end audio signal 262 based on the near-end audio recorded from room B 250, which may comprise the combination of speech B 252 and echo of far-end audio signal 260.

DSP AEC 174*b* comprises a component of client device 150. DSP AEC 174*b* receives the near-end audio signal 262 as input and generates a linear output signal 264 based on the near-end audio signal 262. DSP AEC 174*b* may generate a cancellation signal based on the reference signal, such as by inverting the reference signal. DSP AEC 174*b* may, using a linear filter, combine the cancellation signal with the near-end audio signal 262 to generate a linear output signal 264. The linear output signal 264 may represent near-end audio signal 262 with partial echo cancellation via the combination of the signals by the linear filter. DSP AEC 174*b* may include delay estimation to introduce a delay between the cancellation signal and the near-end audio signal 262 to allow for delay in far-end audio signal 260 following echo paths in the room B 250 to generate echo in the near-end audio signal 262. Optionally, DSP AEC 174*b* may include a non-linear filter that may also be applied to near-end audio signal 262 to generate a non-linear output signal. DSP AEC 174*b* transmits the near-end audio signal 262 and the linear output signal 264 to AEC system 172*b*. In some embodiments, the near-end audio signal 262 may be passed without modification from the DSP AEC 174*b* to the AEC system 172*b* or may be received by the AEC system 172*b* directly from the microphone 254.

AEC system 172*b* performs acoustic echo cancellation on the near-end audio signal 262 based on a far-end audio signal 260, near-end audio signal 262, and linear output signal 264 to generate an echo-cancelled audio signal. The client device 150 may transmit the echo-cancelled audio signal over a network to the video communication platform 140, which transmits the echo-cancelled audio signal to client device 160 in room A 210 as far-end audio signal 220.

Far-end audio signal 220 is received by client device 160 over a network. Far-end audio signal 220 is received and stored by AEC system 172*a* of client device 160 to use for acoustic echo cancellation of speech from room A 210. AEC system 172*a* transmits the far-end audio signal 220 to DSP AEC 174*a* of client device 160 for DSP AEC 174*a* to sample and store as a reference signal in a reference block. In some embodiments, the far-end audio signal 220 may be passed without modification from the AEC system 172*a* to the DSP AEC 174*a* or may be received by the DSP AEC 174*a* from the network in parallel with AEC 172*a*.

DSP AEC 174*a* transmits the far-end audio signal 220 to speaker 216, which may comprise part of a far-end playback system. In some embodiments, the far-end audio signal 220 may be passed without modification from the DSP AEC 174*a* to the speaker 216 or may be received by the speaker 216 from the network in parallel with DSP AEC 174*a*. The speaker 216 emits the far-end audio signal 220 as audio in room A 210. The far-end audio signal 220 may reflect from walls, objects, or other echo paths in room A 210 and generate echo in room A 210.

II. Exemplary System

AEC Network

Figure 3A:
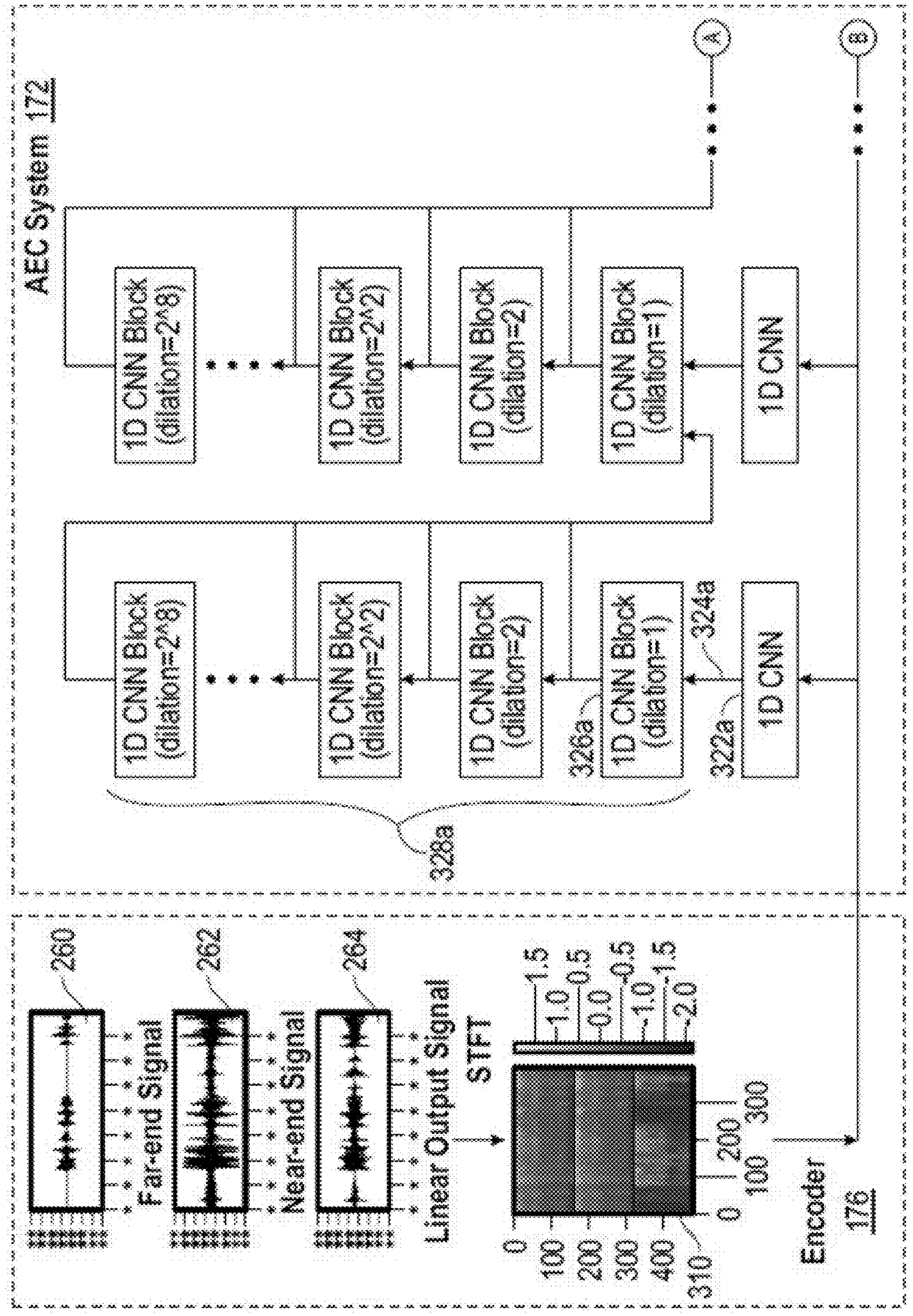
FIGS. 3A-3B are a diagram illustrating an exemplary AEC system according to one embodiment of the present disclosure.
Figure 3B:
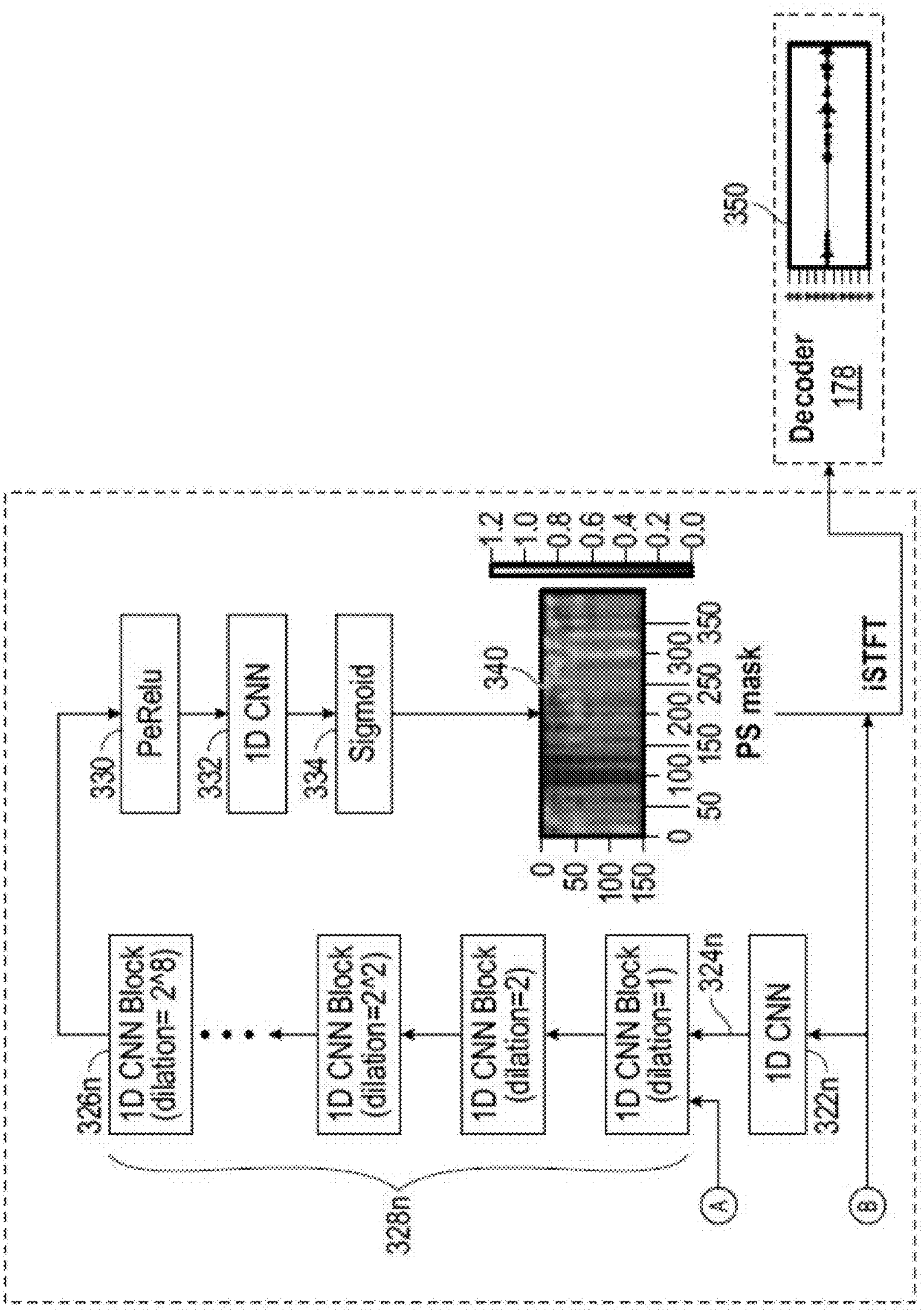

FIGS. 3A-3B are a diagram illustrating an exemplary AEC system 172 according to one embodiment of the present disclosure.

Encoder 176 is provided before the AEC system 172 to convert audio signals to audio signal representations. Far-end audio signal 260, near-end audio signal 262, and linear output signal 264 may be input to the encoder 176 and encoded. Alternatively, encoder 176 may receive and encode as input just the far-end audio signal 260 and near-end audio signal 262, or, in a further alternative, may receive and encode far-end audio signal 260, near-end audio signal 262, linear output signal 264, and non-linear output signal from DSP AEC 174. The input signals, as applicable, may be encoded as far-end audio signal representation, near-end audio signal representation, linear output signal representation, and non-linear output signal representation based on the far-end audio signal 260, near-end audio signal 262, linear output signal 264, and non-linear output signal, respectively.

In one embodiment, encoder 176 performs STFT on audio signals to generate spectrograms. In an embodiment, the far-end audio signal representation, near-end audio signal representation, linear output signal representation, and non-linear output signal representation, as applicable, may each comprise a spectrogram. In an embodiment, the spectrogram may comprise a two-dimensional vector where a first dimension represents time, a second dimension represents frequency, and each value represents the amplitude or magnitude of a particular frequency at a particular time. In combined signal representation 310, different values may be represented by different color intensities.

Alternatively, encoder 176 may generate audio signal representation using other features of the audio signal such as magnitude of STFT, magnitude and phase of STFT, real and imaginary components of STFT, energy, log energy, mel spectrum, mel-frequency cepstral coefficients (MFCC), combinations of these features, and other features. Encoder 176 may comprise for example, a free filter bank, free analytic filter bank, mel magnitude spectrogram filter bank, multi-phase gammatone filter bank, or other encoders. In some embodiments, the filter bank may be fully learned with analyticity constraints, such as through learning parameters of the filters through machine learning, such as neural networks. In some embodiments, encoder 176 may comprise a machine-learning based encoder, such as a neural network, CNN, or DNN, that is trained to generate an encoding of an audio signal. In some embodiments, the far-end audio signal representation, near-end audio signal representation, linear output signal representation, and non-linear output signal representation, as applicable, may be represented by a spectrogram of one or more of these features.

Encoder 176 may concatenate the generated signal representations to generate combined signal representation 310. In an embodiment, the far-end audio signal representation, near-end audio signal representation, and linear output signal representation each comprise two-dimensional vectors that represent spectrograms with a first dimension representing time and a second dimension representing frequency. In an embodiment, the spectrograms may have the same dimensions and may be concatenated in the frequency dimension to generate combined spectrogram that is the same size in the time dimension and three times larger in the frequency dimension compared to the individual spectrograms.

Combined signal representation 310 may be input to AEC system 172 to generate mask 340. AEC system 172 comprises a plurality of 1D CNNs 322*a-n* that each receive combined signal representation 310 as input and generate input signal embeddings 324*a-n* based on the combined signal representation 310. The 1D CNNs 322*a-n* may comprise a kernel that has the same length as the frequency dimension of the combined signal representation 310 and slides across the combined signal representation 310 in the time dimension. Each 1D CNN 322*a-n* is followed by a network block 328*a-n* that receives as input the output of the corresponding 1D CNN 322*a-n*.

Network blocks 328*a-n* may comprise a plurality of convolutional blocks 326*a-n* with increasing dilation. In an embodiment, the dilation rate starts at 1 and increases in powers of 2 to a dilation rate of $2^8$ over the nine blocks in the network blocks 328*a-n*. In an embodiment, dilated convolution may comprise convolution with spacing between the values in a kernel. In an embodiment, a dilation rate of n corresponds to spacing of n−1 between kernel values. In an embodiment, the convolutional blocks in a network block 328*a-n* are in series and each accepts as input the output of the prior convolutional block in the network block 328*a-n*. The output of each convolutional block in a network block 328*a-n* is combined, such as by element-wise summation, to generate the output of the network block 328*a-n*. The output of each network block 328*a-n* is input to the next network block 328*a-n*. The first network block 328*a* receives input of input signal embedding 324*a*, and each network block 328*a-n* after the first receives as input both the output of the prior network block 328*a-n* and an input signal embedding 324*a-n* from the corresponding 1D CNN 322*a-n*. In an embodiment, the output from the prior network block 328*a-n* and the input signal embedding 324*a-n* may be combined, such as by summing them elementwise or by concatenation, for inputting to the corresponding network block 328*a-n*. In some embodiments, the AEC system 172 comprises four network blocks 328*a-n* comprising nine convolutional blocks each, but more or fewer network blocks 328*a-n* and more or fewer convolutional blocks per network block 328*a-n* may be used.

In an embodiment, the output of the last network block 328*n* is input to Parametric Rectified Linear Unit (PReLU) layer 330 to perform PReLU operation. PReLU may comprise a form of non-linear activation function. The output of PReLU layer 330 may be input to 1D CNN 332 to perform a convolution. The output of 1D CNN 332 may be input to sigmoid layer 334 to perform sigmoid function. Sigmoid may comprise a form of non-linear activation function. Sigmoid layer 334 generates mask 340, which may comprise a spectrogram. In some embodiments, mask 340 comprises a phase-sensitive mask. Alternatively, mask 340 may comprise an ideal binary mask, complex ideal ratio mask, or other mask. Mask 340 is combined, such as by taking the product, with the near-end audio signal representation to generate an echo-cancelled audio signal representation 310.

Echo-cancelled audio signal representation 350 is input to decoder 178. Decoder 178 may perform the inverse function to the encoding function of encoder 176 to convert echo-cancelled audio signal representation 310 to an echo-cancelled audio signal 350, which comprises near-end audio signal 262 where echo has been decreased. In one embodiment, decoder 178 performs inverse-STFT on echo-cancelled audio signal representation 310 to convert the STFT spectrogram to an audio signal. Alternatively, in some embodiments, decoder 178 may comprise a filter bank that performs the inverse function to encoder 176, such as a free filter bank, free synthesis filter bank, inverse mel magnitude spectrogram filter bank, inverse multi-phase gammatone filter bank, or other decoders. In some embodiments, decoder 178 may comprise a machine-learning based decoder, such as a neural network, CNN, or DNN, that is trained to generate an audio signal from an audio signal representation.

In one embodiment, AEC system 172 accepts three inputs far-end speech $x_f$, near-end speech $x_n$, and output of linear filter $x_1$, where x represents audio recording. The far-end, near-end and linear filter information are shown as f, n and l, respectively. The output of the linear filter is provided by the DSP AEC 174. This means that the DSP AEC 174 and AEC system 172 share the same linear filter. These three inputs would further pass an STFT encoder. For each input is generated a magnitude-phase pair, {m, p}. In total, three pairs can be calculated, which are $\{m_f, p_f\}$, $\{m_n, p_n\}$, $\{m_l, p_l\}$. The mean and variance are independently calculated for each magnitude spectrum, which means magnitude distributions are converted to a Gaussian distribution. Then these magnitude spectrums are concatenated in order $[m_n, m_l, m_f]$. The concatenated features are shown as combined input signal representation 310.

The concatenated features pass a 1D CNN and nine convolutional blocks. These nine convolutional blocks have the same architecture while only the dilation step is different. Their dilation increases from $2^0$ to $2^8$. The number of convolutional blocks can be increased if necessary, where a larger number of blocks may improve performance with higher computational cost. After the nine convolutional blocks is generated a 2D spectrum, with the same size as the input spectrum. The above processing is repeated four times, but after the first pass, the inputs become the output of the previous network block and the concatenated spectrums. The number of repeats can also be adjusted based on the device executing AEC system 172.

The output of the above blocks would further pass a PReLU layer, 1D CNN, and sigmoid layers. The output of Sigmoid is scaled up from [0, 1] to [−1, 3]. The scaled spectrum comprises mask 340. Although the ground-truth mask is unknown, it can be estimated by the phase-sensitive mask approach: the calculated speech magnitude $m_e$ is product of phase-sensitive mask and near-end magnitude $m_n$. The speech phase $p_e$ may be assumed to be the same as $p_n$. The speech signal without echo signal can be estimated from the speech magnitude-phase pair $\{m_e, p_e\}$ by iSTFT.

Figure 4:
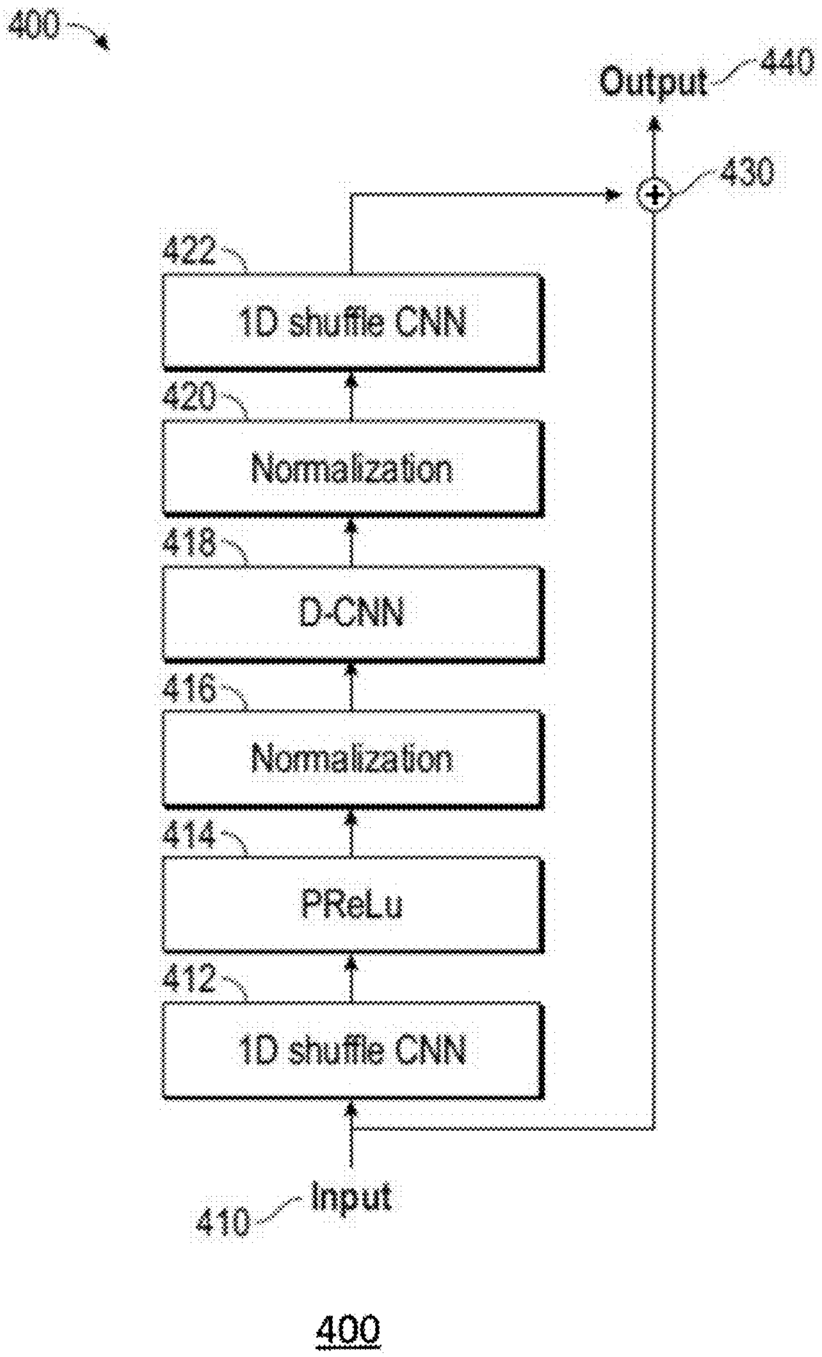
FIG. 4 is a diagram illustrating an exemplary convolutional block according to one embodiment of the present disclosure.

FIG. 4 is a diagram illustrating an exemplary convolutional block 400 according to one embodiment of the present disclosure. Each convolutional block 326*a-n* may have the same structure.

Input 410 to convolutional block 400 may comprise a spectrogram. The 1D shuffle CNN 412 receives input 410, performs 1D shuffle convolution, and generates output to PReLU layer 414. The 1D shuffle CNN may comprise a CNN where the inputs to and output from the CNN kernel are not required to be localized to the same area, which may be achieved by performing a shuffle operation to shuffle data. PReLU layer 414 performs PReLU operation and generates output to normalization layer 416. Normalization layer 416 performs normalization and generates output to depth-wise convolution (D-Conv) layer 418. D-Conv layer 418 performs depth-wise convolution and generates output to normalization layer 418. Normalization layer 418 performs normalization and generates output to 1D shuffle CNN layer 422. The 1D shuffle CNN layer 422 performs 1D shuffle convolution to generate output that is summed with the input 410 in summation operation 430 to generate output 440. The summation operation 430 may comprise the same operation shown in FIGS. 3A-B where the output of each convolutional block in a network block 328*a-n* is summed and output to the next network block 328*a-n*.

Each convolutional block 326*a-n* may consist of a 1D shuffle convolution operation followed by a D-Conv operation, with nonlinear activation function and normalization added between two 1D shuffle convolution operations.

Training

In an embodiment, AEC system 172 is trained on one or more training samples 186 to learn and update the parameters 173 of the AEC system 172. In some embodiments, training samples 186 comprise input and output pairs for supervised learning, wherein the input may comprise one or more audio signals or signal representations for input and the output may comprise an audio signal or audio signal representation of the target output of the AEC system 172.

In an embodiment, a training sample may be generated by providing an audio recordings dataset comprising one or more clean speech recordings (e.g., speech only with no echo). A first audio recording is selected for playing as far-end audio signal 260 and a second audio recording is selected for playing as near-end speech. In a room, first audio recording is played as a far-end audio signal 260 and the second audio recording is played to simulate speech 252 by the user. The second audio recording combines with the echo in the room from the first audio recording, and the combined audio is recorded by a microphone in the room to generate near-end audio signal 262. The near-end audio signal 262 is input to DSP AEC 174 to generate a linear output signal 264. Optionally, a non-linear output signal may also be generated.

The input signals comprise the input part of the training sample. In one embodiment, the input comprises the far-end audio signal 260, near-end audio signal 262, and linear output signal 264. Alternatively, input may comprise just the far-end audio signal 260 and near-end audio signal 262, or, in a further alternative, far-end audio signal 260, near-end audio signal 262, linear output signal 264, and non-linear output signal. The target output of the training sample may comprise the second audio recording of clean speech played in the room or an audio signal representation of the second audio recording generated by encoder 176. In an embodiment, the target output may also comprise a target mask, which may be generated based on the second audio recording and the near-end audio signal 262.

After generating a plurality of training samples, one or more training samples may be input to AEC system 172 to update the parameters 173. For a selected training sample, the input portion of the training sample is input to AEC system 172. The AEC system 172 may process the input signals as described in FIGS. 3A-4, method 500, method 600, and elsewhere herein. The input signals are input to encoder 176 to generate combined input signal representation 310, which may comprise a concatenated spectrogram of the signal representations of the input signals. The combined input signal representation 310 is input to AEC system 172 comprising one or more network blocks 328*a-n* to generate a mask 340, each network block 328*a-n* comprising one or more convolutional blocks 326*a-n*, each convolutional block 326*a-n* comprising one or more neural networks. Network blocks 328*a-n* may comprise a plurality of convolutional blocks 326*a-n* with increasing dilation. Each convolutional block 326*a-n* may comprise of a 1D shuffle convolution operation followed by a D-Conv operation, with nonlinear activation function and normalization added between two 1D shuffle convolution operations. The output of network blocks 328*a-n* may be input to PReLU 330, 1D CNN 332, and sigmoid layer 334 to generate mask 340. Mask 340 may be combined with near-end audio signal 262 to generate echo-cancelled audio signal representation 350.

The AEC system 172 may be trained by evaluating the error between the echo-cancelled audio signal representation 350 and the target output audio signal representation from the training sample. Moreover, training may also evaluate and use the error between the mask 340 and a target output mask from the training sample. For example, the errors may be combined, such as by summation. Training may comprise updating parameters 173, such as neural network weights, of the AEC system 172 by backpropagation to minimize the error, which may be expressed as a loss function. In some embodiments, the error may comprise time-level Mean Squared Error (MSE), time-level Mean Absolute Error (MSA), mask-level MSE, mask-level MAE, spectrum-level MSE, spectrum-level MAE, double-talk MSE (MSE on training samples where far-end and near-end speakers are talking at the same time), double-talk MAE (MSA on training samples where far-end and near-end speakers are talking at the same time), single-talk MSE (MSE on training samples where only one side is talking at the same time), single-talk MSA (MSA on training samples where only one side is talking at the same time), teacher-student MSE, teacher-student MSA, signal-to-noise ratio, Short Term Objective Intelligibility (STOI) loss, Perceptual Metric for Speech Quality Evaluation (PMSQE), other loss functions, or a combination of loss functions. In one embodiment, the AEC system 172 is trained on a combination of three loss functions, MSE, PMSQE, and PMSQE for echo signal with respective loss weights of 1:0.5:0.5. In an embodiment, one or more parameters 173, such as neural network weights, are updated to minimize the loss function based on a gradient-based optimization algorithm.

AEC system 172 may allow for low-complexity acoustic echo cancellation that is suitable for use in many real-time systems for video conferencing or audio calls. AEC system 172 may comprise a small number of parameters 173 and be capable of execution on client device 150 and additional users' client device(s) 160. In one embodiment, the total size of the parameters 173 of AEC system 172 may be approximately 1 MB. In some embodiments, the total size of the parameters 173 of AEC system 172 may be approximately 2 MB, 5 MB, 10 MB, 20 MB, or other sizes. In some embodiments, the total size of the parameters 173 of AEC system 172 is less than 1 MB, 2 MB, 5 MB, 10 MB, 20 MB, or other sizes. In some embodiments, processing time of AEC system 172 is less than 10 ms, which can be suitable for real-time systems.

Unlike traditional DSP AEC, AEC system 172 may comprise an end-to-end system that directly estimates clear speech without echo and does not require estimating the echo path. AEC system 172 may also operate without requiring a DSP AEC non-linear filter, which can reduce complexity. The ability of the AEC system 172 to learn parameters 173 through training may reduce development time. In one embodiment, AEC system 172 is causal, wherein convolutions performed by CNN and convolutional blocks do not violate temporal ordering and the model at a particular timestamp does not depend on future timestamps. Moreover, AEC system 172 may provide improved performance with reduced echo and clearer speech compared to traditional DSP AEC.

III. Exemplary Methods

Figure 5:
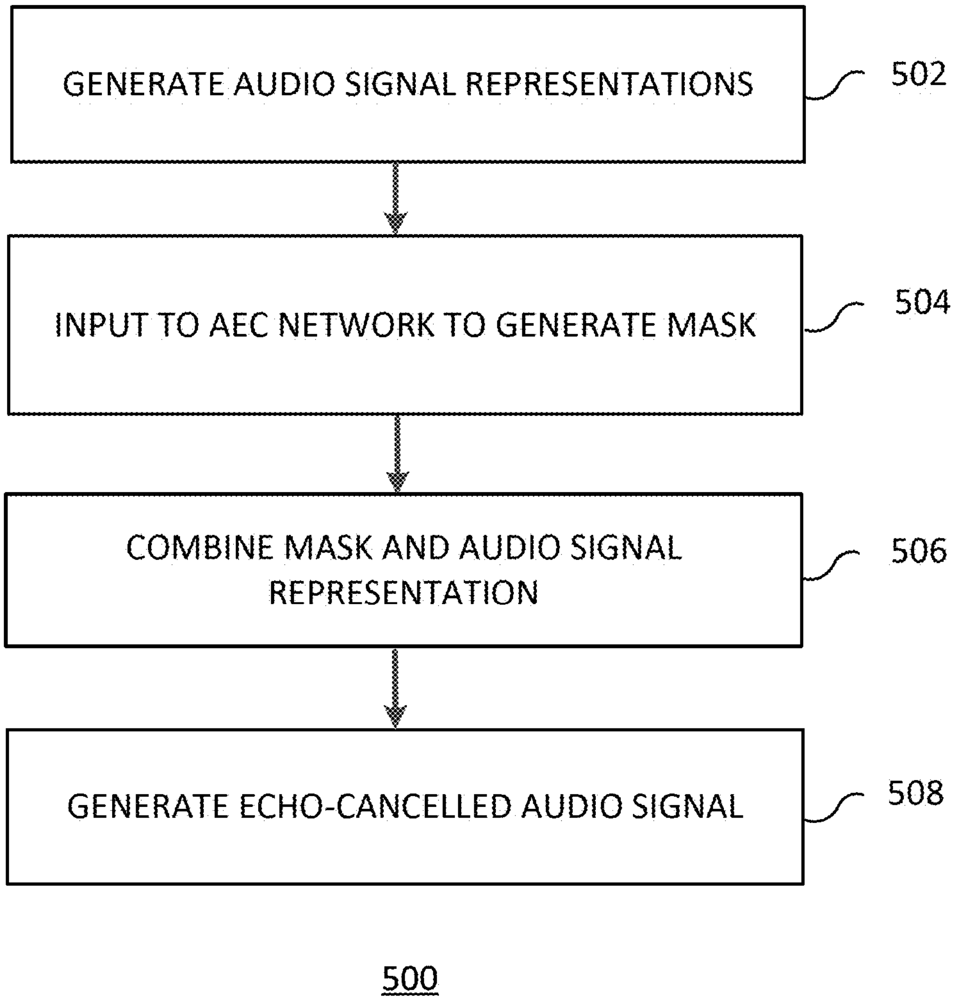
FIG. 5 is a flow chart illustrating an exemplary method that may be performed in some embodiments.

FIG. 5 is a flow chart illustrating an exemplary method 500 that may be performed in some embodiments.

At step 502, a far-end audio signal representation, a near-end audio signal representation, and a linear output signal representation are generated based on a far-end audio signal, a near-end audio signal, and a linear output signal, respectively. In an embodiment, the signal representations are generated by encoder 176. In one embodiment, encoder 176 performs STFT on the signals to generate spectrograms. Alternatively, encoder 176 may generate signal representations using other features of signals such as magnitude of STFT, magnitude and phase of STFT, real and imaginary components of STFT, energy, log energy, mel spectrum, mel-frequency cepstral coefficients (MFCC), combinations of these features, and other features.

At step 504, the far-end audio signal representation, the near-end audio signal representation, and the linear output signal representation are input into an AEC network 172 comprising one or more network blocks to generate a mask. Each network block comprises one or more convolutional blocks, and each convolutional block comprises one or more neural networks. In an embodiment, each network block comprises a series of convolutional blocks of increasing dilation, the output of each convolutional block in the series being input to the next convolutional block in the series. The network blocks may be arranged in a series, and the outputs of one or more convolutional blocks in a network block are summed and input to a next network block. In an embodiment, the sum of the outputs of the one or more convolutional blocks in the network block are fused with an embedding of the far-end audio signal representation, the near-end audio signal representation, and the linear output signal representation prior to inputting the sum to the next network block. In an embodiment, each convolutional block comprises one or more shuffle CNNs. Each convolutional block may comprise a 1D shuffle convolution operation followed by a D-Conv operation, with nonlinear activation function and normalization added between two 1D shuffle convolution operations.

At step 506, the mask and the near-end audio signal representation are combined to generate an echo cancelled audio signal representation. In an embodiment, mask may be combined with near-and audio signal representation by taking the product.

At step 508, an echo-cancelled audio signal is generated based on the echo-cancelled audio signal representation. The echo-cancelled audio signal may be generated by decoder 178. Decoder 178 may perform the inverse function to the encoding function of encoder 176 to convert echo-cancelled audio signal representation to an echo-cancelled audio signal, which comprises near-end audio signal where echo has been cancelled. In one embodiment, decoder 178 performs inverse-STFT on echo-cancelled audio signal representation to convert the STFT spectrogram to an audio signal.

Figure 6A:
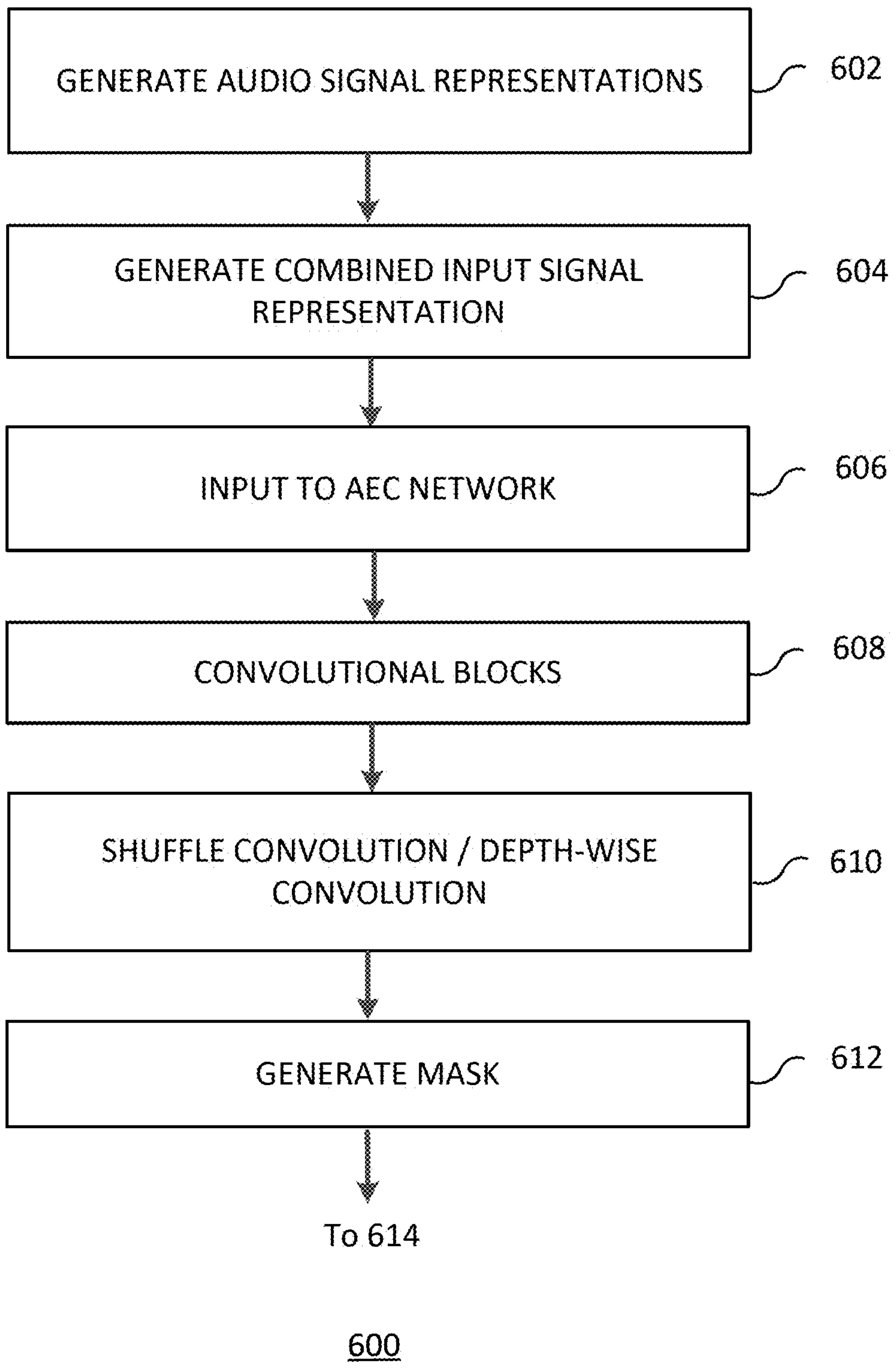
FIGS. 6A-6B are a flow chart illustrating an exemplary method that may be performed in some embodiments.
Figure 6B:
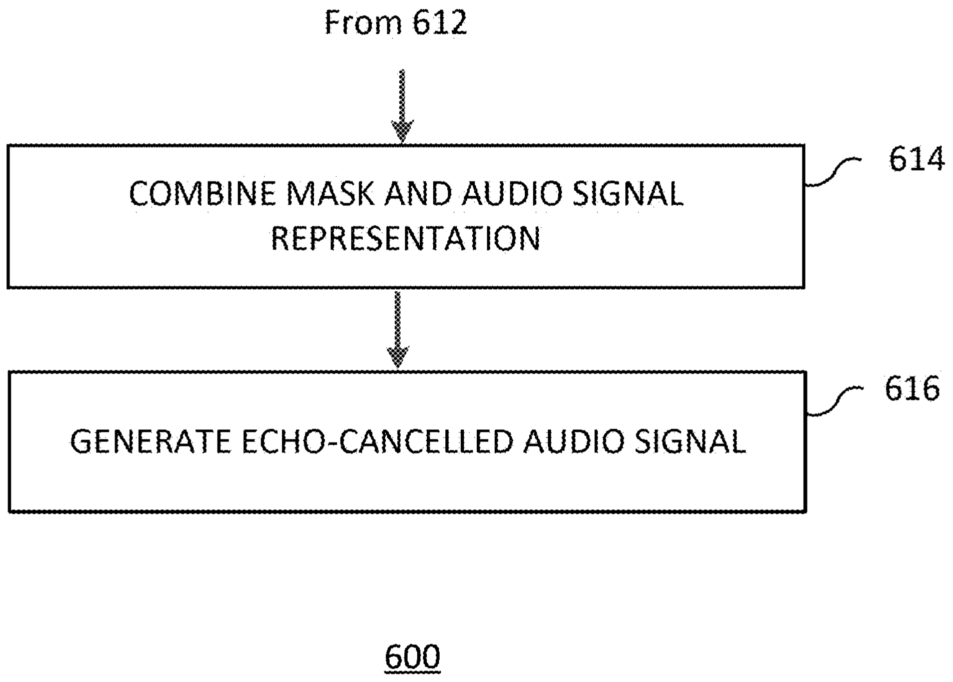

FIGS. 6A-6B are a flow chart illustrating an exemplary method 600 that may be performed in some embodiments.

At step 602, a far-end audio signal representation, a near-end audio signal representation, and a linear output signal representation are generated based on a far-end audio signal, a near-end audio signal, and a linear output signal, respectively. In an embodiment, the signal representations are generated by encoder 176 as described in step 502 and elsewhere herein.

At step 604, the far-end audio signal representation, the near-end audio signal representation, and the linear output signal representation are combined to generate a combined input signal representation. In an embodiment, the far-end audio signal representation, the near-end audio signal representation, and the linear output signal representation are combined by concatenation.

At step 606, the combined input signal representation is input into an AEC network comprising one or more network blocks. In an embodiment, the combined input signal representation is processed by a plurality of 1D CNNs to generate input signal embeddings.

At step 608, in each network block, the combined input signal representation is processed by a series of convolutional blocks of increasing dilation. In an embodiment, the dilation rate increases by powers of two. In an embodiment, the output of each convolutional block in the series is combined and input to a next network block.

At step 610, in each convolutional block, the combined input signal representation is processed by one or more shuffle convolution operations and a depth-wise convolution operation. In an embodiment, each convolutional block comprises two 1D shuffle CNNs with a non-linear activation function, D-Conv layer, and normalization layers between them.

At step 612, the plurality of network blocks and convolutional blocks generate a mask.

At step 614, the mask and the near-end audio signal representation are combined to generate an echo cancelled audio signal representation. In an embodiment, mask may be combined with near-end audio signal representation by taking the product.

At step 616, an echo-cancelled audio signal is generated based on the echo-cancelled audio signal representation. The echo-cancelled audio signal may be generated by decoder 178 as described in step 508 and elsewhere herein.

Figure 7:
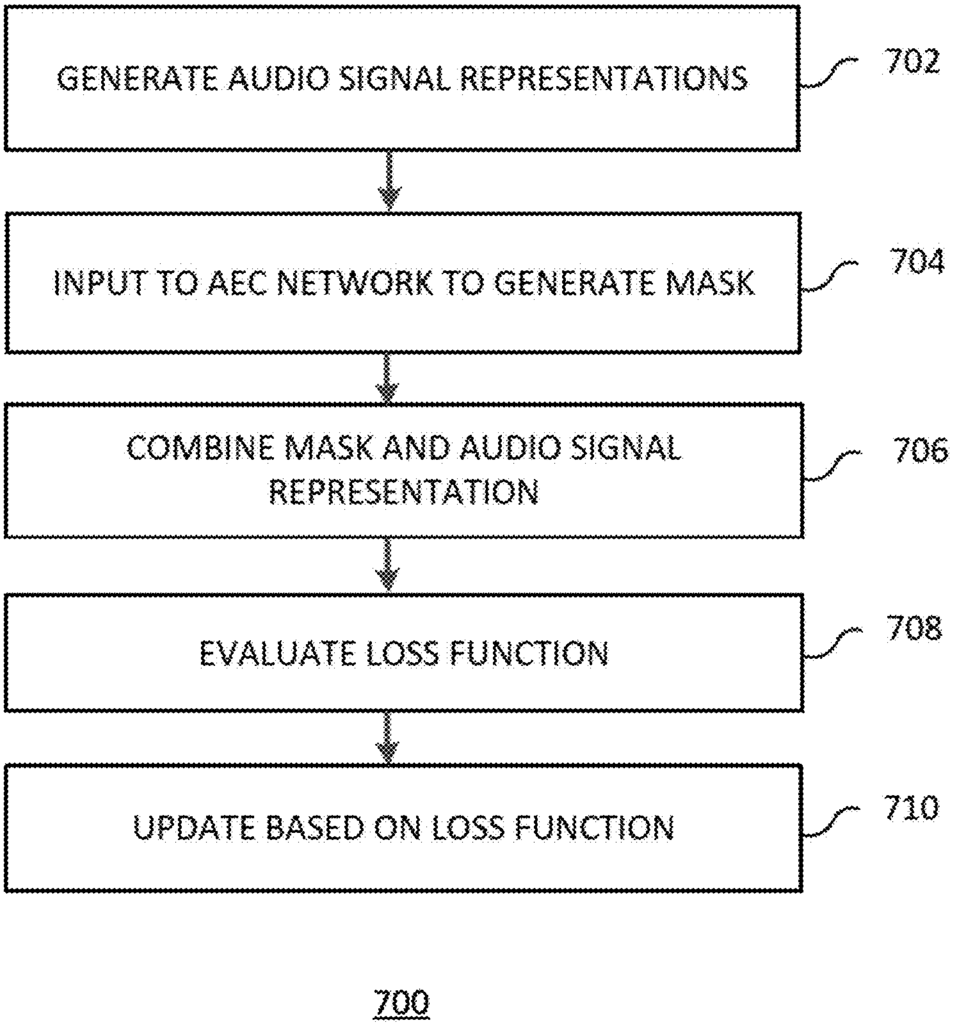
FIG. 7 is a flow chart illustrating an exemplary method that may be performed in some embodiments.

FIG. 7 is a flow chart illustrating an exemplary method 700 that may be performed in some embodiments.

At step 702, a far-end audio signal representation, a near-end audio signal representation, and a linear output signal representation are generated based on a far-end audio signal, a near-end audio signal, and a linear output signal, respectively. In an embodiment, the signal representations are generated by encoder 176 as described in step 502 and elsewhere herein.

At step 704, the far-end audio signal representation, the near-end audio signal representation, and the linear output signal representation are input into an AEC network 172 comprising one or more network blocks to generate a mask. Each network block comprises one or more convolutional blocks, and each convolutional block comprises one or more neural networks as describe in step 504 and elsewhere herein.

At step 706, the mask and the near-end audio signal representation are combined to generate an echo cancelled audio signal representation. In an embodiment, mask may be combined with near-and audio signal representation by taking the product.

At step 708, a loss function is evaluated based on the difference between the echo-cancelled audio signal representation and a target output audio signal representation and the mask and a target output mask. In some embodiments, the loss function may comprise a plurality of loss functions, such as a linear combination of loss functions where each individual loss function is weighted by a corresponding weight.

At step 710, one or more weights of the AEC network 172 are updated based on the loss function. In an embodiment, the one or more weights of the AEC network 172 are updated to minimize the loss function, such as by using a gradient-based optimization algorithm.

Figure 8:
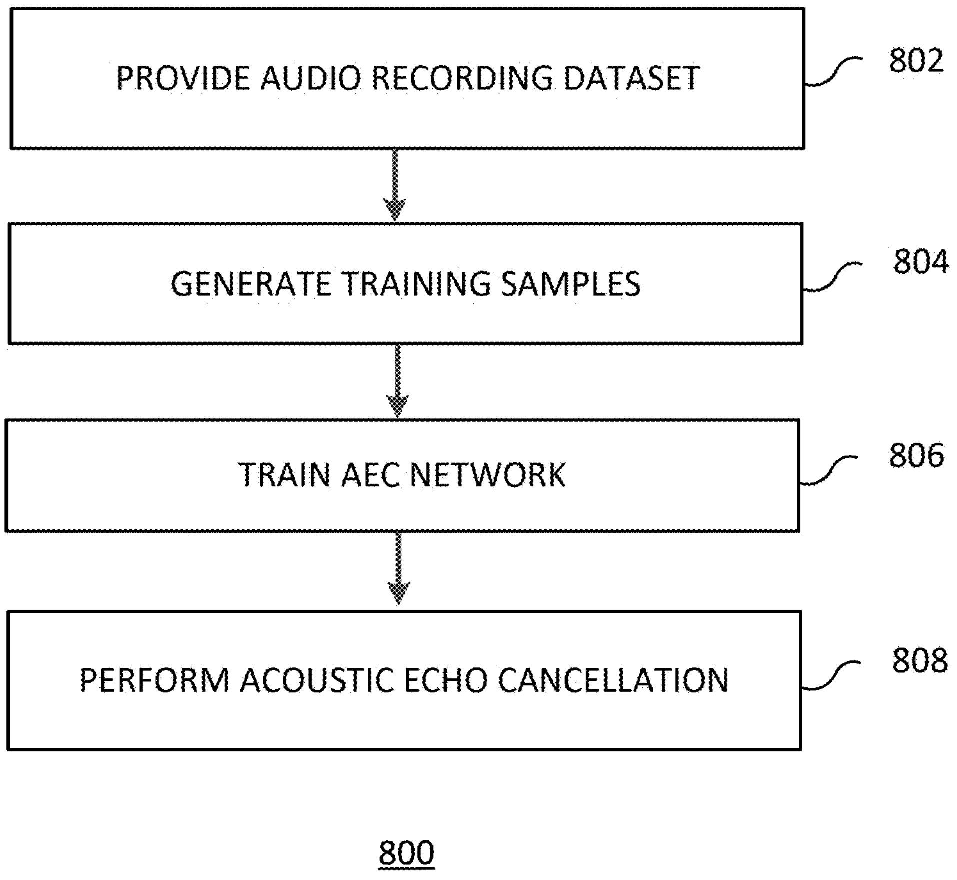
FIG. 8 is a flow chart illustrating an exemplary method that may be performed in some embodiments.

FIG. 8 is a flow chart illustrating an exemplary method 800 that may be performed in some embodiments.

At step 802, an audio recording dataset is provided comprising one or more audio signals. In an embodiment, the audio signals may comprise speech recordings.

At step 804, a plurality of training samples are generated based on the audio recording dataset. In an embodiment, pairs of audio signals are selected from the audio recording dataset and played in a room as a far-end audio signal and simulated near-end speech. The combined audio from the simulated near-end speech and echo from the far-end audio signal is recorded by a microphone to generate near-end audio signal. The far-end audio signal and near-end audio signal are input to a DSP AEC to generate a linear output signal. The far-end audio signal, near-end audio signal, and linear output signal may comprise the input portion of a training sample. The output portion of a training sample may comprise the simulated near-end speech and a target output mask that is generated based on the simulated near-end speech and near-end audio signal.

At step 806, an AEC network 172 is trained based on the one or more training samples. The AEC network 172 may comprise a neural network, such as a DNN. In an embodiment, AEC network 172 may comprise one or more neural network weights that are updated to minimize a loss function based on a gradient-based optimization algorithm.

At step 808, acoustic echo cancellation of an audio recording from a user is performed by the AEC network 172. In an embodiment, the AEC network 172 may process the audio recording using its neural network, such as a DNN, to perform acoustic echo cancellation to remove or reduce echo in an audio recording from the user. In an embodiment, the audio recording from the user may comprise real-time audio from a videoconference that is recorded by videoconferencing software. For example, AEC network 172 on client 150 may perform acoustic echo cancellation on the audio recording prior to transmitting the audio recording to video communication platform 140 or processing engine 102.

Exemplary Computer System

Figure 9:
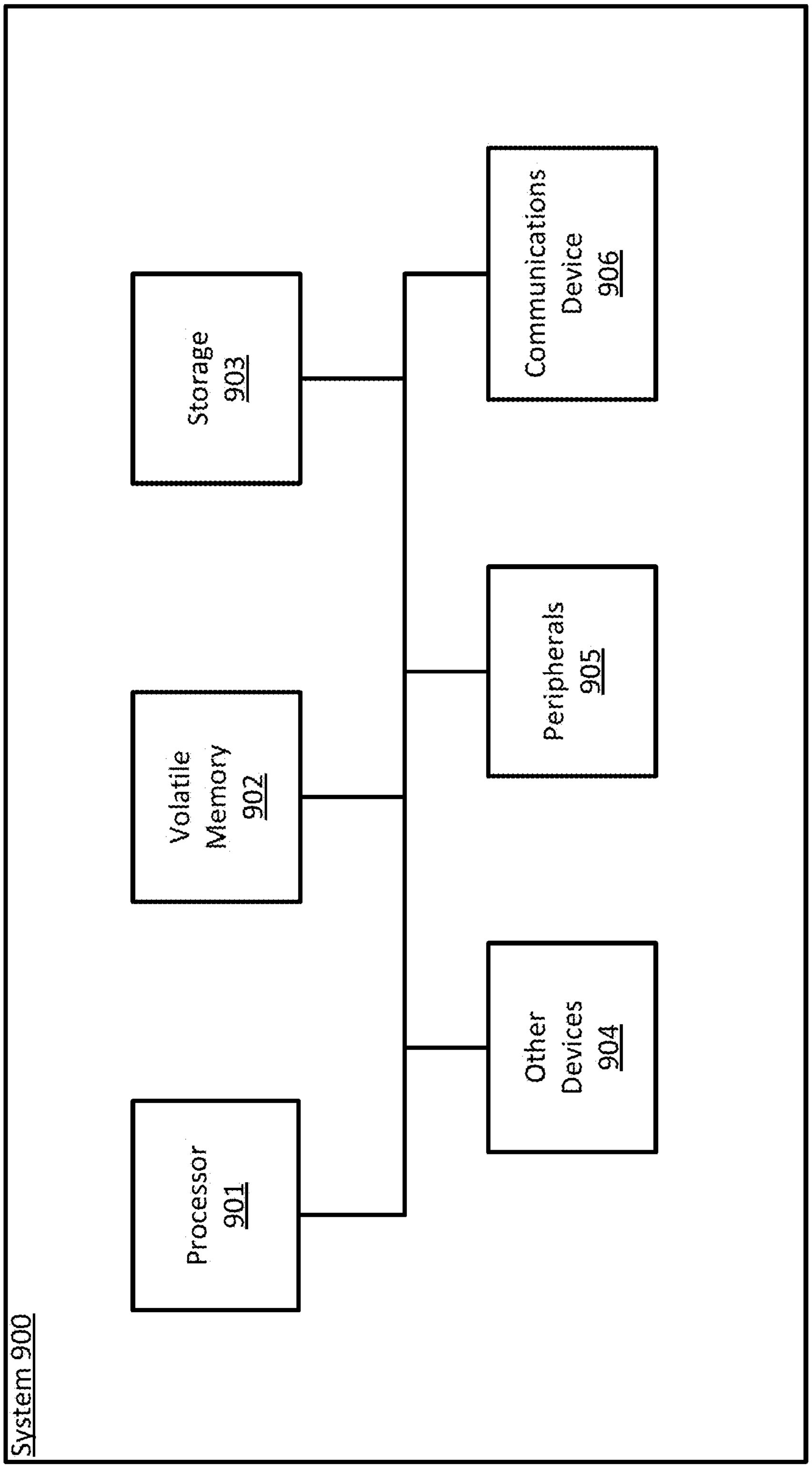
FIG. 9 illustrates an exemplary computer system wherein embodiments may be executed.

FIG. 9 is a diagram illustrating an exemplary computer that may perform processing in some embodiments. Exemplary computer 900 may perform operations consistent with some embodiments. The architecture of computer 900 is exemplary. Computers can be implemented in a variety of other ways. A wide variety of computers can be used in accordance with the embodiments herein.

Processor 901 may perform computing functions such as running computer programs. The volatile memory 902 may provide temporary storage of data for the processor 901. RAM is one kind of volatile memory. Volatile memory typically requires power to maintain its stored information. Storage 903 provides computer storage for data, instructions, and/or arbitrary information. Non-volatile memory, which can preserve data even when not powered and including disks and flash memory, is an example of storage. Storage 903 may be organized as a file system, database, or in other ways. Data, instructions, and information may be loaded from storage 903 into volatile memory 902 for processing by the processor 901.

The computer 900 may include peripherals 905. Peripherals 905 may include input peripherals such as a keyboard, mouse, trackball, video camera, microphone, and other input devices. Peripherals 905 may also include output devices such as a display. Peripherals 905 may include removable media devices such as CD-R and DVD-R recorders/players. Communications device 906 may connect the computer 900 to an external medium. For example, communications device 906 may take the form of a network adapter that provides communications to a network. A computer 900 may also include a variety of other devices 904. The various components of the computer 900 may be connected by a connection medium such as a bus, crossbar, or network.

It will be appreciated that the present disclosure may include any one and up to all of the following examples.

Example 1: A computer-implemented method for acoustic echo cancellation, comprising: generating a far-end audio signal representation, a near-end audio signal representation, and a linear output signal representation based on a far-end audio signal, a near-end audio signal, and a linear output signal, respectively; inputting the far-end audio signal representation, the near-end audio signal representation, and the linear output signal representation into an AEC network comprising one or more network blocks to generate a mask, each network block comprising one or more convolutional blocks, each convolutional block comprising one or more neural networks; combining the mask and the near-end audio signal representation to generate an echo-cancelled audio signal representation; and generating an echo-cancelled audio signal based on the echo-cancelled audio signal representation.

Example 2: The method of Example 1, wherein the far-end audio signal representation, the near-end audio signal representation, and the linear output signal representation comprise STFTs of the far-end audio signal, the near-end audio signal, and the linear output signal, respectively.

Example 3: The method any of Examples 1-2, wherein the echo-cancelled audio signal is generated based on an inverse STFT of the echo-cancelled audio signal representation.

Example 4: The method of any of Examples 1-3, wherein each network block comprises a series of convolutional blocks of increasing dilation, the output of each convolutional block in the series being input to the next convolutional block in the series.

Example 5: The method of any Examples 1-4, further comprising: summing the outputs of one or more convolutional blocks in a network block and inputting the sum to a next network block.

Example 6: The method of any Examples 1-5, further comprising: fusing the sum of the outputs of the one or more convolutional blocks in the network block with an embedding of the far-end audio signal representation, the near-end audio signal representation, and the linear output signal representation prior to inputting the sum to the next network block.

Example 7: The method of any Examples 1-6, wherein the far-end audio signal comprises a first speech audio signal, the near-end audio signal comprises a second speech audio signal combined with an echo of the far-end audio signal, and the linear output signal comprises output of a DSP AEC linear filter, and the AEC network is trained by minimizing a loss function based on the difference between the echo-cancelled audio signal and the second speech audio signal.

Example 8: A non-transitory computer readable medium that stores executable program instructions that when executed by one or more computing devices configure the one or more computing devices to perform operations comprising: generating a far-end audio signal representation, a near-end audio signal representation, and a linear output signal representation based on a far-end audio signal, a near-end audio signal, and a linear output signal, respectively; inputting the far-end audio signal representation, the near-end audio signal representation, and the linear output signal representation into an AEC network comprising one or more network blocks to generate a mask, each network block comprising one or more convolutional blocks, each convolutional block comprising one or more neural networks; combining the mask and the near-end audio signal representation to generate an echo-cancelled audio signal representation; and generating an echo-cancelled audio signal based on the echo-cancelled audio signal representation.

Example 9: The non-transitory computer readable medium of Example 8, wherein the far-end audio signal representation, the near-end audio signal representation, and the linear output signal representation comprise STFTs of the far-end audio signal, the near-end audio signal, and the linear output signal, respectively.

Example 10: The non-transitory computer readable medium of any Example 8-9, wherein the echo-cancelled audio signal is generated based on an inverse STFT of the echo-cancelled audio signal representation.

Example 11: The non-transitory computer readable medium of any Example 8-10, wherein each network block comprises a series of convolutional blocks of increasing dilation, the output of each convolutional block in the series being input to the next convolutional block in the series.

Example 12: The non-transitory computer readable medium of any Examples 8-11, further comprising: summing the outputs of one or more convolutional blocks in a network block and inputting the sum to a next network block.

Example 13: The non-transitory computer readable medium of any Examples 8-12, further comprising: fusing the sum of the outputs of the one or more convolutional blocks in the network block with an embedding of the far-end audio signal representation, the near-end audio signal representation, and the linear output signal representation prior to inputting the sum to the next network block.

Example 14: The non-transitory computer readable medium of any Examples 8-13, wherein the far-end audio signal comprises a first speech audio signal, the near-end audio signal comprises a second speech audio signal combined with an echo of the far-end audio signal, and the linear output signal comprises output of a DSP AEC linear filter, and the AEC network is trained by minimizing a loss function based on the difference between the echo-cancelled audio signal and the second speech audio signal.

Example 15: An acoustic echo cancellation system comprising one or more processors configured to perform the operations of: generating a far-end audio signal representation, a near-end audio signal representation, and a linear output signal representation based on a far-end audio signal, a near-end audio signal, and a linear output signal, respectively; inputting the far-end audio signal representation, the near-end audio signal representation, and the linear output signal representation into an acoustic echo cancellation (AEC) network comprising one or more network blocks to generate a mask, each network block comprising one or more convolutional blocks, each convolutional block comprising one or more neural networks; combining the mask and the near-end audio signal representation to generate an echo-cancelled audio signal representation; and generating an echo-cancelled audio signal based on the echo-cancelled audio signal representation.

Example 16: The system of Example 15, wherein the far-end audio signal representation, the near-end audio signal representation, and the linear output signal representation comprise Short-time Fourier Transforms (STFT) of the far-end audio signal, the near-end audio signal, and the linear output signal, respectively.

Example 17: The system of any Examples 15-16, wherein the echo-cancelled audio signal is generated based on an inverse STFT of the echo-cancelled audio signal representation.

Example 18: The system of any Examples 15-17, wherein each network block comprises a series of convolutional blocks of increasing dilation, the output of each convolutional block in the series being input to the next convolutional block in the series.

Example 19: The system of any Examples 15-18, wherein the processors are further configured to perform the operations of: summing the outputs of one or more convolutional blocks in a network block and inputting the sum to a next network block.

Example 20: The system of any Examples 15-19, wherein the processors are further configured to perform the operations of: fusing the sum of the outputs of the one or more convolutional blocks in the network block with an embedding of the far-end audio signal representation, the near-end audio signal representation, and the linear output signal representation prior to inputting the sum to the next network block.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method for acoustic echo cancellation, comprising:

generating a far-end audio signal representation, a near-end audio signal representation, and a linear output signal representation based on a far-end audio signal, a near-end audio signal, and a linear output signal, respectively;

inputting the far-end audio signal representation, the near-end audio signal representation, and the linear output signal representation into an AEC network comprising one or more network blocks to generate a mask, each network block comprising one or more convolutional blocks, each convolutional block comprising one or more neural networks;

combining the mask and the near-end audio signal representation to generate an echo-cancelled audio signal representation; and generating an echo-cancelled audio signal based on the echo-cancelled audio signal representation.

2. The method of claim 1, wherein the far-end audio signal representation, the near-end audio signal representation, and the linear output signal representation comprise STFTs of the far-end audio signal, the near-end audio signal, and the linear output signal, respectively.

3. The method of claim 2, wherein the echo-cancelled audio signal is generated based on an inverse STFT of the echo-cancelled audio signal representation.

4. The method of claim 1, wherein each network block comprises a series of convolutional blocks of increasing dilation, the output of each convolutional block in the series being input to the next convolutional block in the series.

5. The method of claim 4, further comprising:

summing the outputs of one or more convolutional blocks in a network block and inputting the sum to a next network block.

6. The method of claim 5, further comprising:

fusing the sum of the outputs of the one or more convolutional blocks in the network block with an embedding of the far-end audio signal representation, the near-end audio signal representation, and the linear output signal representation prior to inputting the sum to the next network block.

7. The method of claim 1, wherein the far-end audio signal comprises a first speech audio signal, the near-end audio signal comprises a second speech audio signal combined with an echo of the far-end audio signal, and the linear output signal comprises output of a DSP AEC linear filter, and the AEC network is trained by minimizing a loss function based on the difference between the echo-cancelled audio signal and the second speech audio signal.

8. A non-transitory computer readable medium that stores executable program instructions that when executed by one or more computing devices configure the one or more computing devices to:

generate a far-end audio signal representation, a near-end audio signal representation, and a linear output signal representation based on a far-end audio signal, a near-end audio signal, and a linear output signal, respectively;

input the far-end audio signal representation, the near-end audio signal representation, and the linear output signal representation into an AEC network comprising one or more network blocks to generate a mask, each network block comprising one or more convolutional blocks, each convolutional block comprising one or more neural networks;

combine the mask and the near-end audio signal representation to generate an echo-cancelled audio signal representation; and generate an echo-cancelled audio signal based on the echo-cancelled audio signal representation.

9. The non-transitory computer readable medium of claim 8, wherein the far-end audio signal representation, the near-end audio signal representation, and the linear output signal representation comprise STFTs of the far-end audio signal, the near-end audio signal, and the linear output signal, respectively.

10. The non-transitory computer readable medium of claim 9, wherein the echo-cancelled audio signal is generated based on an inverse STFT of the echo-cancelled audio signal representation.

11. The non-transitory computer readable medium of claim 8, wherein each network block comprises a series of convolutional blocks of increasing dilation, the output of each convolutional block in the series being input to the next convolutional block in the series.

12. The non-transitory computer readable medium of claim 11, further comprising executable program instructions that when executed by one or more computing devices configure the one or more computing devices to:

sum the outputs of one or more convolutional blocks in a network block and inputting the sum to a next network block.

13. The non-transitory computer readable medium of claim 12, further comprising executable program instructions that when executed by one or more computing devices configure the one or more computing devices to:

fuse the sum of the outputs of the one or more convolutional blocks in the network block with an embedding of the far-end audio signal representation, the near-end audio signal representation, and the linear output signal representation prior to inputting the sum to the next network block.

14. The non-transitory computer readable medium of claim 8, wherein the far-end audio signal comprises a first speech audio signal, the near-end audio signal comprises a second speech audio signal combined with an echo of the far-end audio signal, and the linear output signal comprises output of a DSP AEC linear filter, and the AEC network is trained by minimizing a loss function based on the difference between the echo-cancelled audio signal and the second speech audio signal.

15. An acoustic echo cancellation system comprising:

a non-transitory computer-readable medium; and one or more processors configured to execute processor-executable instructions stored in the non-transitory computer-readable medium, the processor-executable instructions configured to cause the one or more processors to:

generate a far-end audio signal representation, a near-end audio signal representation, and a linear output signal representation based on a far-end audio signal, a near-end audio signal, and a linear output signal, respectively;

input the far-end audio signal representation, the near-end audio signal representation, and the linear output signal representation into an acoustic echo cancellation (AEC) network comprising one or more network blocks to generate a mask, each network block comprising one or more convolutional blocks, each convolutional block comprising one or more neural networks;

combine the mask and the near-end audio signal representation to generate an echo-cancelled audio signal representation; and generate an echo-cancelled audio signal based on the echo-cancelled audio signal representation.

16. The system of claim 15, wherein the far-end audio signal representation, the near-end audio signal representation, and the linear output signal representation comprise Short-time Fourier Transforms (STFT) of the far-end audio signal, the near-end audio signal, and the linear output signal, respectively.

17. The system of claim 16, wherein the echo-cancelled audio signal is generated based on an inverse STFT of the echo-cancelled audio signal representation.

18. The system of claim 15, wherein each network block comprises a series of convolutional blocks of increasing dilation, the output of each convolutional block in the series being input to the next convolutional block in the series.

19. The system of claim 18, wherein the one or more processors are further configured to execute processor-executable instructions stored in the non-transitory computer-readable medium to:

sum the outputs of one or more convolutional blocks in a network block and inputting the sum to a next network block.

20. The system of claim 19, wherein the one or more processors are further configured to execute processor-executable instructions stored in the non-transitory computer-readable medium to:

fuse the sum of the outputs of the one or more convolutional blocks in the network block with an embedding of the far-end audio signal representation, the near-end audio signal representation, and the linear output signal representation prior to inputting the sum to the next network block.

* * * * *